United States Patent [19]
Swanby

[11] 3,800,458
[45] Apr. 2, 1974

[54] COMBINATION ONE WAY OR TWO WAY FISH LINE RELEASE DEVICE

[76] Inventor: Melvin Swanby, 716 Old Howard Hill Rd., Duluth, Minn. 55804

[22] Filed: Mar. 29, 1973

[21] Appl. No.: 346,072

[52] U.S. Cl. .............................................. 43/43.12
[51] Int. Cl. ............................................ A01k 91/00
[58] Field of Search ................................... 43/43.12

[56] References Cited
UNITED STATES PATENTS

| | | | |
|---|---|---|---|
| 2,608,017 | 8/1952 | Hinkson | 43/43.12 |
| 2,735,212 | 2/1956 | Baum | 43/43.12 |
| 2,858,637 | 11/1958 | Stark | 43/43.12 |
| 3,516,192 | 6/1970 | MacLeod et al. | 43/43.12 |

*Primary Examiner*—Antonio F. Guida
*Assistant Examiner*—Daniel J. Leach
*Attorney, Agent, or Firm*—Wicks & Nemer

[57] ABSTRACT

A device for releasably mounting a fish line including a body member having a pair of spaced apart front and rear support members each having a hole therethrough through which is slidably extended a rod having an eye formed on one end with the other free end extending outwardly of the front support. The body is formed with first and second line-receiving holes together with a spring for urging the end of said rod outwardly of said front support. A fish line extends in a first loop formation through the eye of the rod and the first and second line-receiving holes and is engaged with the free end of the rod. A first portion of the line extends rearwardly of the eye and a second portion of the line is formed into a second loop formation and passed through the second line-receiving hole into engagement with the free end of the rod with the free end of the second portion attached to a fish pole. When tension is placed on the line, the rod is pulled rearwardly to withdraw the free end of said rod from both of said loops to release said line from said device.

13 Claims, 7 Drawing Figures

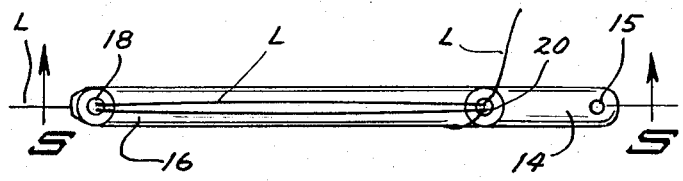
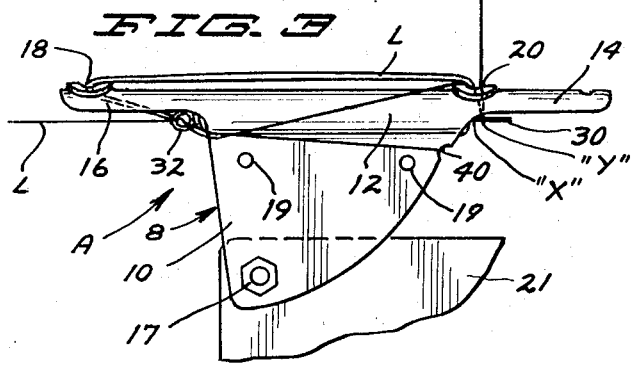
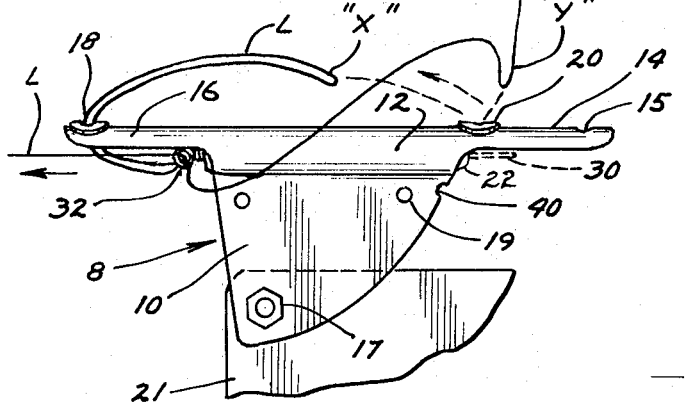
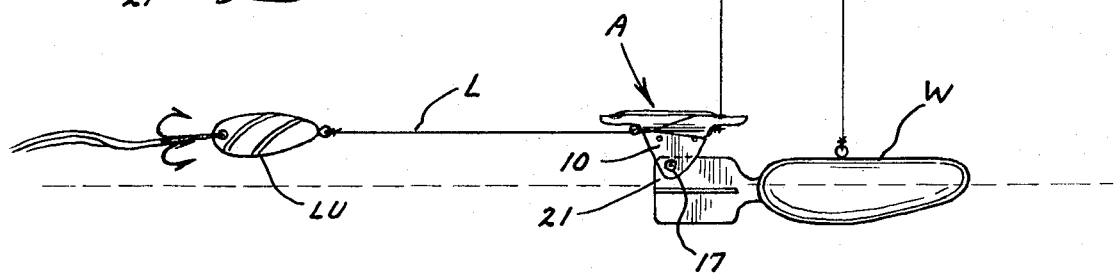

COMBINATION ONE WAY OR TWO WAY FISH LINE RELEASE DEVICE

SUMMARY OF THE INVENTION

The invention relates to a device which releasably mounts a fish line on a member. It is an object of the invention to provide the above device in one arrangement as a one-way release which allows the device to release only upon a pull on the line straight back from the device by a fish pulling on the lure on the line and which will not release by a pull exerted on the line going upwardly to the fisherman's pole.

In a further arrangement a device is provided which is a two way release with which the fisherman's line may be released from the device either by a pull on the line portion between the device and the lure or a pull on the line portion between the device and the fisherman's pole.

It is a further object of the invention to provide the above device, which may be arranged as either a one way or a two way release and in either case allows the fish line to release completely free of the device with nothing remaining on, about, or in connection with the fish line whereby the fisherman may reel up a fish all the way to the end of the fish pole if necessary.

It is a still further object of the invention to provide the above device with which no part of the device remains in, on, or about the fish line and as a result the user of the device may select an infinite choice of distances for the lure behind the device particularly when trolling deep.

The device can be used not only in connection with a deep troller or a down rigger from a given line weight, but from any location on the line weight line between the boat, and the line weight, or towed behind the line weight, or attached to a tolling plate, or trolling board, or anywhere on the line between the trolling board and the boat.

In the drawings forming part of this application:

FIG. 1 is an illustration of a device for releasably attaching a fish line to a member such as a line wieght and embodying the invention with the line shown in attached condition.

FIG. 2 is a top plan view of the device with the line in attached condition.

FIG. 3 is a side elevational view thereof with a line in operational attachment thereto.

FIG. 4 is a side elevational view similar to FIG. 3 but with the line in partial release from the device or partial attachment to the device.

Figure 5:
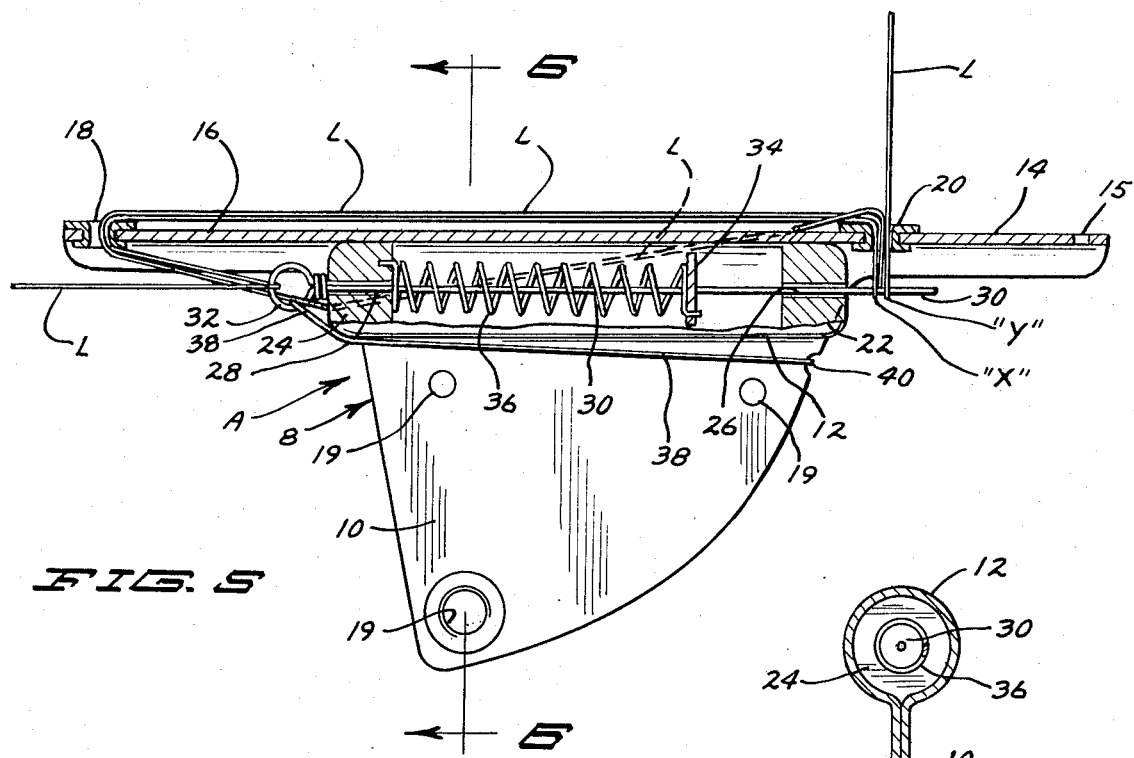
FIG. 5 is a sectional view on the line 5—5 of FIG. 2, a portion of the line being broken away.
Figure 6:
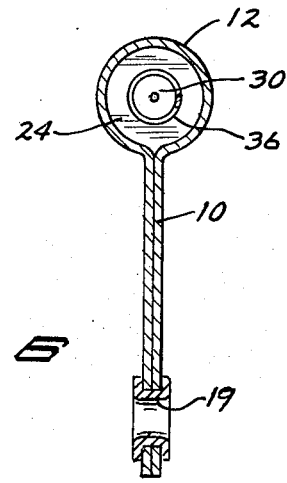
FIG. 6 is a sectional view on the line 6—6 of FIG. 5.

Referring to the drawings in detail the device A includes the body member 8 which includes the substantially flat keel 10 having formed on the upper edge thereof the tubular portion 12. The forward end of the tubular portion 12 terminates in the front extension 14, and the rear end of the tubular portion 12 terminates in the rear extension 16. The rear extension 16 has formed therein a first line-engaging hole 18 and the front extension 14 has formed therein a second line-engaging hole 20. The keel has formed therein the holes 19 any of which may be used to attach the device to the fin 21 of the wieght W by means of the small bolt 17. The front extension 14 is formed with the attaching hole 15. The weight W is attached to the line Wa leading from the boat B.

The tubular body portion 12 has mounted axially therein the front support 22 and spaced therefrom and in axial alignment therewith the rear support 24. The support 22 has extending therethrough the axial hole 26 and the support 24 has extending therethrough the axial hole 28 in axial alignment with hole 26.

The numeral 30 designates a rod plunger which is slidably mounted in the holes of the supports 22 and 24, and formed on the rear end of the rod is the eye 32. The front end of the rod extends outwardly of the front support 22. Further provided is the stop 34 which is fixedly secured to the rod 30 at a point intermediate the supports 22 and 24. Interposed between the stop 34 and the support 28 and positioned upon the rod 30 is the coil spring 36 which normally urges the rod forwardly with the eye 32 against the outer end of the support 24 and with the front end of the rod 30 extended outwardly and forwardly of the support 22.

Figure 7:
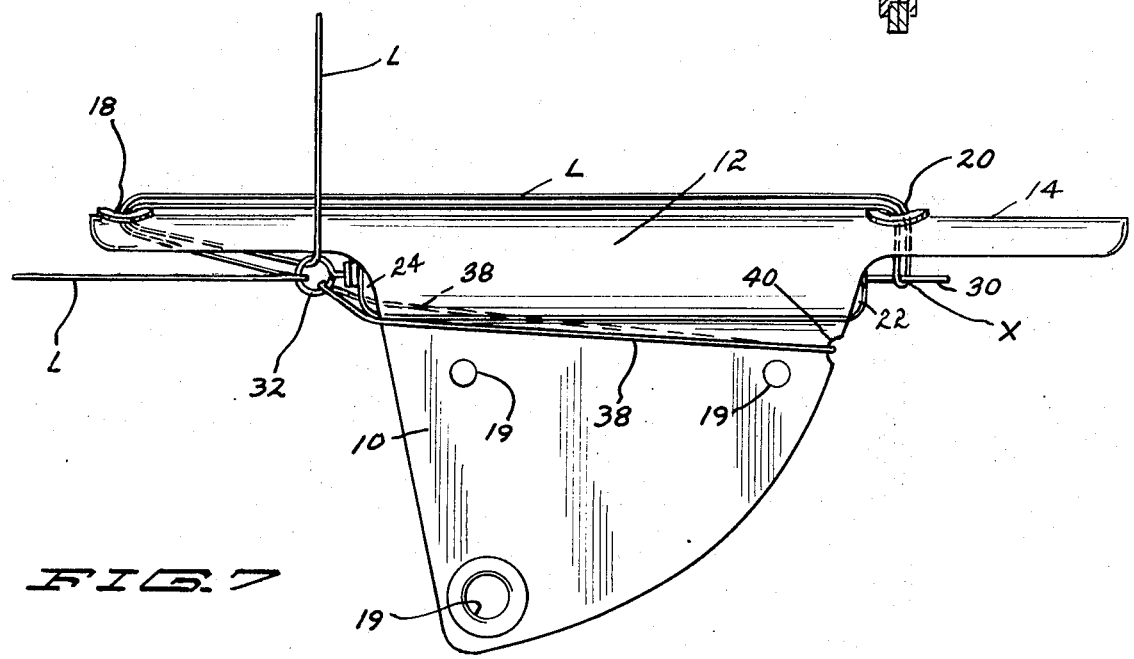
FIG. 7 is a side elevational view of a further embodiment of the invention with an arrangement for a two-way line release.

Further illustrated is the fish line L which is releasably attached to the device A in the following manner; As step one a long first loop "X" is formed in the line L, and the loop is fed through the eye 32 of rod 30, then fed upwardly through the hole 18 and then downwardly through the hole 20 where the loop "X" is slipped over and engaged upon the end portion of the rod 30 in extended condition. This is illustrated in FIG. 7 and completion of step one makes the device a two way line release as herein before and hereinafter set forth. As step two another portion of the line L from the eye 32 is formed into a second loop "Y" and fed downwardly through the hole 20 where the loop is slipped over and engaged upon the end portion of the rod 30 alongside and in front of the loop "X," particularly FIGS. 1, 2, 3 and 5. Completion of step two makes the device a one way line release as described herein.

Further provided is the rubber band 38 which engages in the notch 40 and also engages the eye 32. This places further tension on the rod 30 and where tension is needed in addition to that provided by the spring 36, the band 38 is used.

A lure Lu is attached to the line L as illustrated in FIG. 1 and the device A is attached to the fin 21 of the weight W. When a fish grabs the lure, tension is placed upon the line, and the line pulls the rod 30 rearwardly whereby the end of the rod is withdrawn into the body portion 12 and from the loops "X" and "Y." As a result the loop "X" is withdrawn from the hole 18. With still further tension on the line the loop "Y" is straightened out, and the loop "X" and the line that formed loop "Y" is pulled through the eye 32 and completely free of the device A and weight W. As a result a fish on the lure may be reeled in on the line free of the device and the weight.

It will be seen that a pull on the line L straight back will release the line from the device A, but if the pull is toward an upward direction, the rod 30 is not pulled back and the loops thereon not released. In other words only a pull straight back will release the line L from the device A an the member such as weight W on which it is mounted. The line L will not be released due to pull upwardly by the fisherman's pole P on the boat B.

With the line completely free and clear of the device, the fish on the lure can be reeled in all the way up to the end of the pole. Also with no part of the device on or in connection with the line, the fisherman may select an infinite choice of distances for the lure behind the device when trolling deep.

In FIG. 7 is illustrated a further embodiment of the invention wherein the body member 8 is the same as that shown in the other figures but which includes the single loop "X" of the line L engaged through the eye 32, through the hole 18 and hole 20 with the closed end of the loop in engagement with the end of the rod 30 as in step one previously set forth. With this arrangement an upward pull on the line L from the eye 32 withdraws the rod 30 from the loop X whereby the line L is completely free of the device. In FIG. 7 is illustrated a two way release of the line L from the device A. One release is by a pull on the line portion to which the bait is connected and the other release is by a pull on that portion of the line connected to the fisherman's pole.

I claim:

1. A device for releasably attaching a fish line to a member comprising in combination:
   a. a body member,
   b. a rod,
   c. means for slidably mounting said rod on said body member with the free end of said rod extending outwardly of said mounting means,
   d. the other end of said rod having an eye formed thereon extending outwardly of said mounting means,
   e. first line-receiving means formed in said body,
   f. second line-receiving means formed in said body,
   g. means for urging said rod outwardly of said mounting means,
   h. means for attaching said body to a member,
   i. a fish line extended in a first loop formation through said eye of said rod, said first line-receiving means, said second line-receiving means and in engagement with said free end of said rod with one portion of the first loop extending rearwardly of said eye, and with a further portion of said line extended in a second loop formation through said second line-receiving means and in engagement with said free end of said rod with one portion of the second loop extended free of the device for attachment to a fish pole, whereby tension on the one portion of said first loop withdraws said free end of said rod from both of said loops to release said line from said device.

2. The device of claim 1 in which said body includes a keel.

3. The device of claim 2 in which said body includes a rear examination which carries said first line-receiving means.

4. The device of claim 3 in which said first line-receiving means is a hole in said body.

5. The device of claim 4 in which said second line-receiving means is a hole in said body.

6. The device of claim 1 in which said body includes a rear extension which carries said first line-receiving means.

7. The device of claim 1 in which said first line-receiving means is a hole in said body.

8. The device of claim 1 in which said first line-receiving means is a hole in said body.

9. The device of claim 5 in which said means for slidably mounting said rod on said body member includes
   a. a pair of spaced apart front and rear supports carried by said body,
   b. each support formed with a hole through which said rod extends.

10. The device of claim 1 in which said means for slidably mounting said rod on said body member includes:
    a. a pair of spaced apart front and rear supports carried by said body,
    b. each support formed with a hole through which said rod extends.

11. The device of claim 10 in which said means for urging said rod outwardly of said mounting supports includes a coil spring positioned on said rod between said rear support and a stop member mounted on said rod.

12. A device for releasably attaching a fish line to a member comprising in combination:
    a. a body member,
    b. a rod,
    c. means for slidably mounting said rod on said body member with the free end of said rod extending outwardly of said mounting means,
    d. the other end of said rod having an eye formed thereon extending outwardly of said mounting means,
    e. first line-receiving means formed in said body,
    f. second line-receiving means formed in said body,
    g. means for urging said rod outwardly of said mounting means,
    h. means for attaching said body to a member,
    i. a fish line extended in a loop formation through said eye on said rod, said first line-receiving means said second line-receiving means and in engagement with said free end of said rod with one portion of the loop extended rearwardly of said eye for connection with a fish lure and the other portion of the loop for extension to a fish pole.

13. A device for releasably attaching a fish line to a member comprising:
    a. a body member,
    b. rod means,
    c. means for slidably mounting said rod means on said body member with the free end of said rod means extending outwardly of said mounting means,
    d. the other end of said rod means having an eye fored thereon and extending outwardly of said mounting means,
    e. line-receiving means formed in said body,
    f. means for urging said rod outwardly of said mounting means, and
    g. means for attaching said body to a member.

* * * * *

UNITED STATES PATENT OFFICE
CERTIFICATE OF CORRECTION

Patent No. 3,800,458          Dated April 2, 1974

Inventor(s)  Melvin Swanby

It is certified that error appears in the above-identified patent and that said Letters Patent are hereby corrected as shown below:

Column 2, line 65, "an" should read -- and --. Claim 3, line 2, "examination" should read -- extension --. Claim 12, element "i", line 2, "on" should read -- of --. Claim 13, element "d", line 2, "fored" should read -- formed --.

Signed and sealed this 24th day of September 1974.

(SEAL)
Attest:

McCOY M. GIBSON JR.
Attesting Officer

C. MARSHALL DANN
Commissioner of Patents